Sept. 16, 1952

W. B. BLANTON ET AL
TESTING ARRANGEMENT FOR AUTOMATIC
TELEGRAPH SWITCHING SYSTEM 2,611,026

Filed Feb. 4, 1950

4 Sheets-Sheet 1

BY

INVENTORS
W. B. BLANTON
A. H. SCHEINMAN
M. R. Marsh
ATTORNEY

Sept. 16, 1952

W. B. BLANTON ET AL 2,611,026

TESTING ARRANGEMENT FOR AUTOMATIC TELEGRAPH SWITCHING SYSTEM

Filed Feb. 4, 1950

4 Sheets-Sheet 2

INVENTORS
W. B. BLANTON
A. H. SCHEINMAN

BY

W. R. Marsh

ATTORNEY

Sept. 16, 1952 W. B. BLANTON ET AL 2,611,026

TESTING ARRANGEMENT FOR AUTOMATIC TELEGRAPH SWITCHING SYSTEM

Filed Feb. 4, 1950 4 Sheets-Sheet 3

INVENTORS
W. B. BLANTON
A. H. SCHEINMAN

BY M. R. Marsh

ATTORNEY

INVENTORS
W. B. BLANTON
A. H. SCHEINMAN
BY
M. R. Marsh
ATTORNEY

Patented Sept. 16, 1952 2,611,026

UNITED STATES PATENT OFFICE 2,611,026

TESTING ARRANGEMENT FOR AUTOMATIC TELEGRAPH SWITCHING SYSTEM

William B. Blanton, Rockville Centre, and Arnold H. Scheinman, Brooklyn, N. Y., assignors to The Western Union Telegraph Company, New York, N. Y., a corporation of New York Application February 4, 1950, Serial No. 142,458

13 Claims. (Cl. 178—2)

Figure 1:
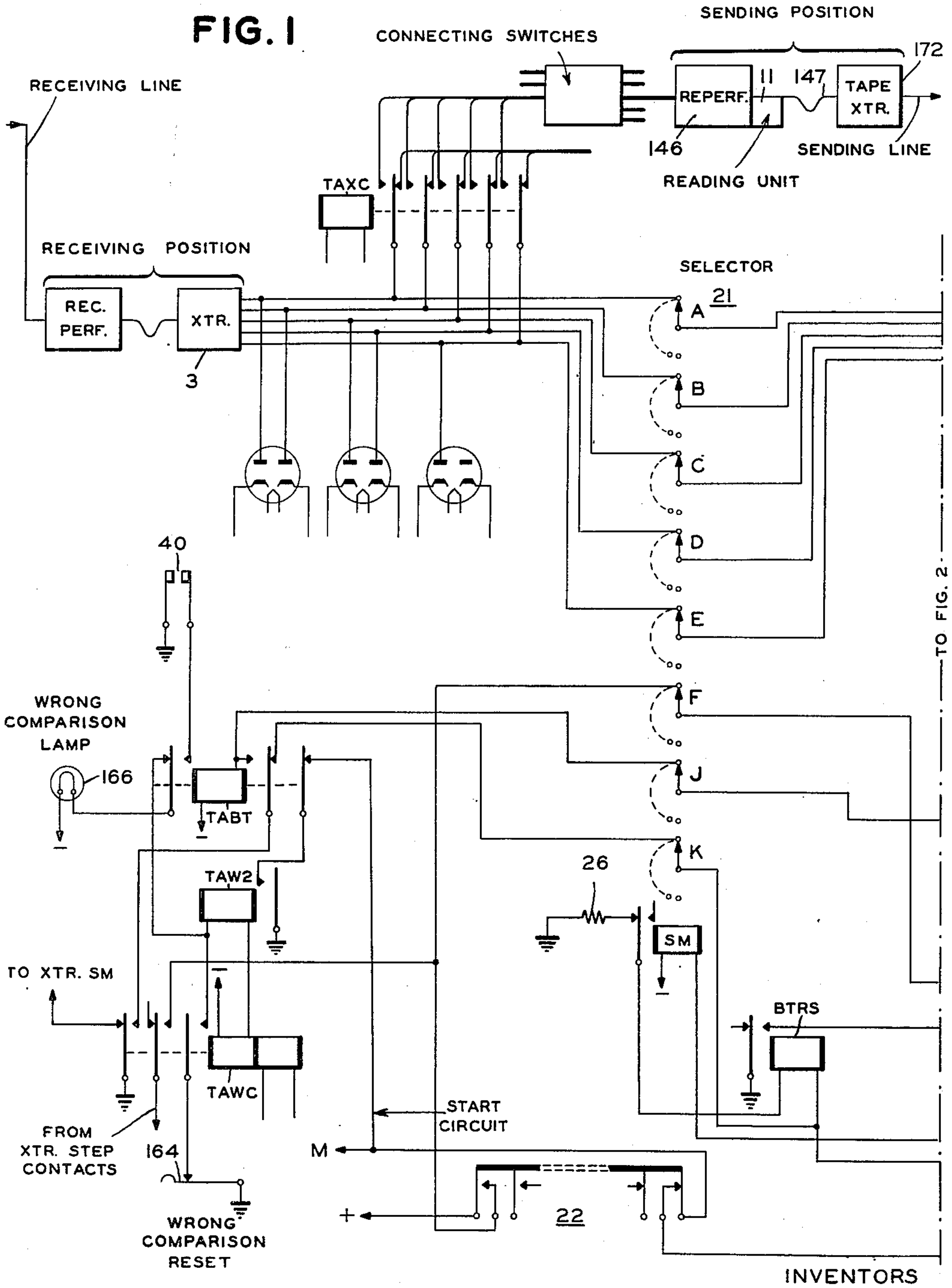
Figure 2:
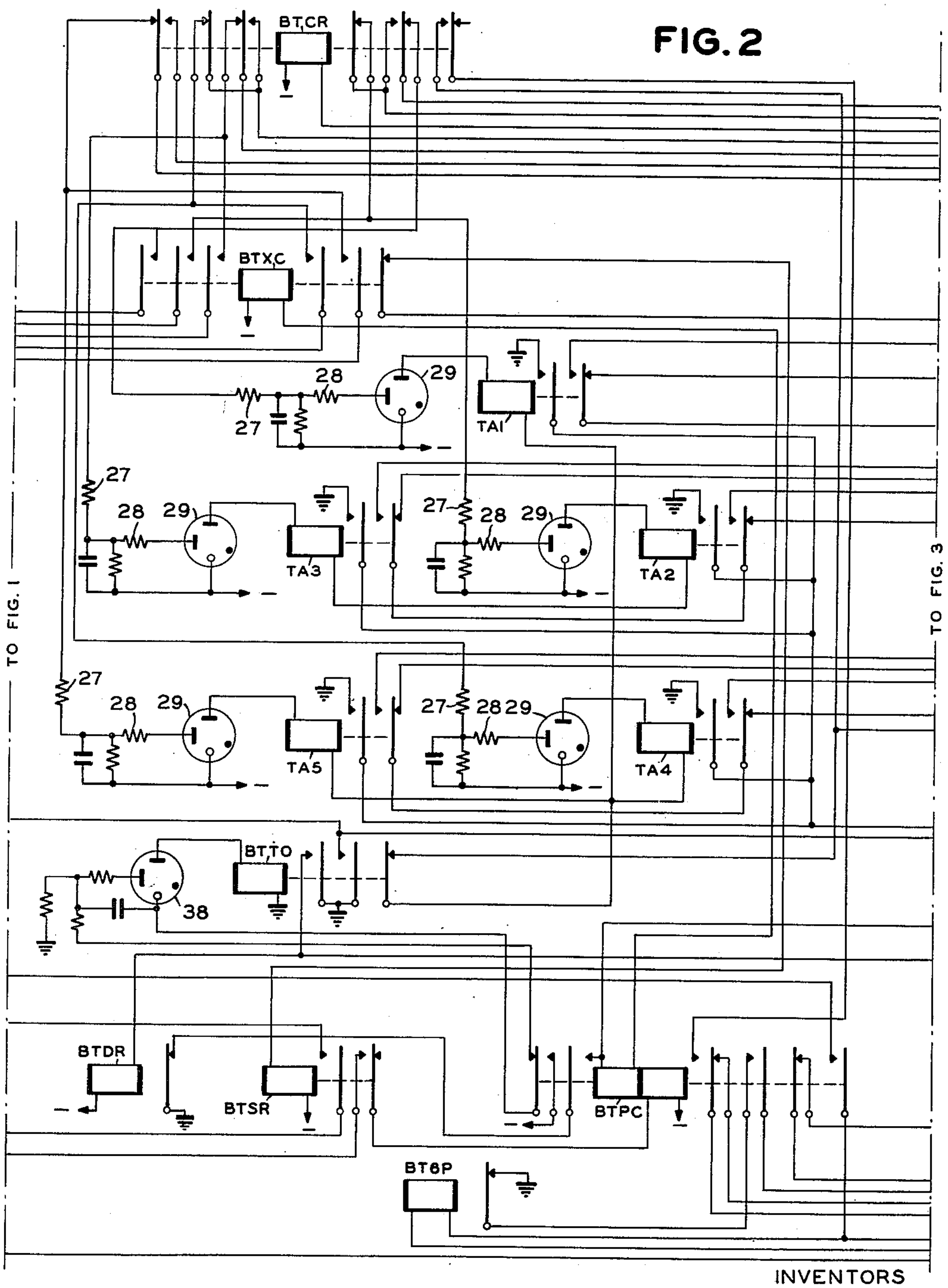
Figure 3:
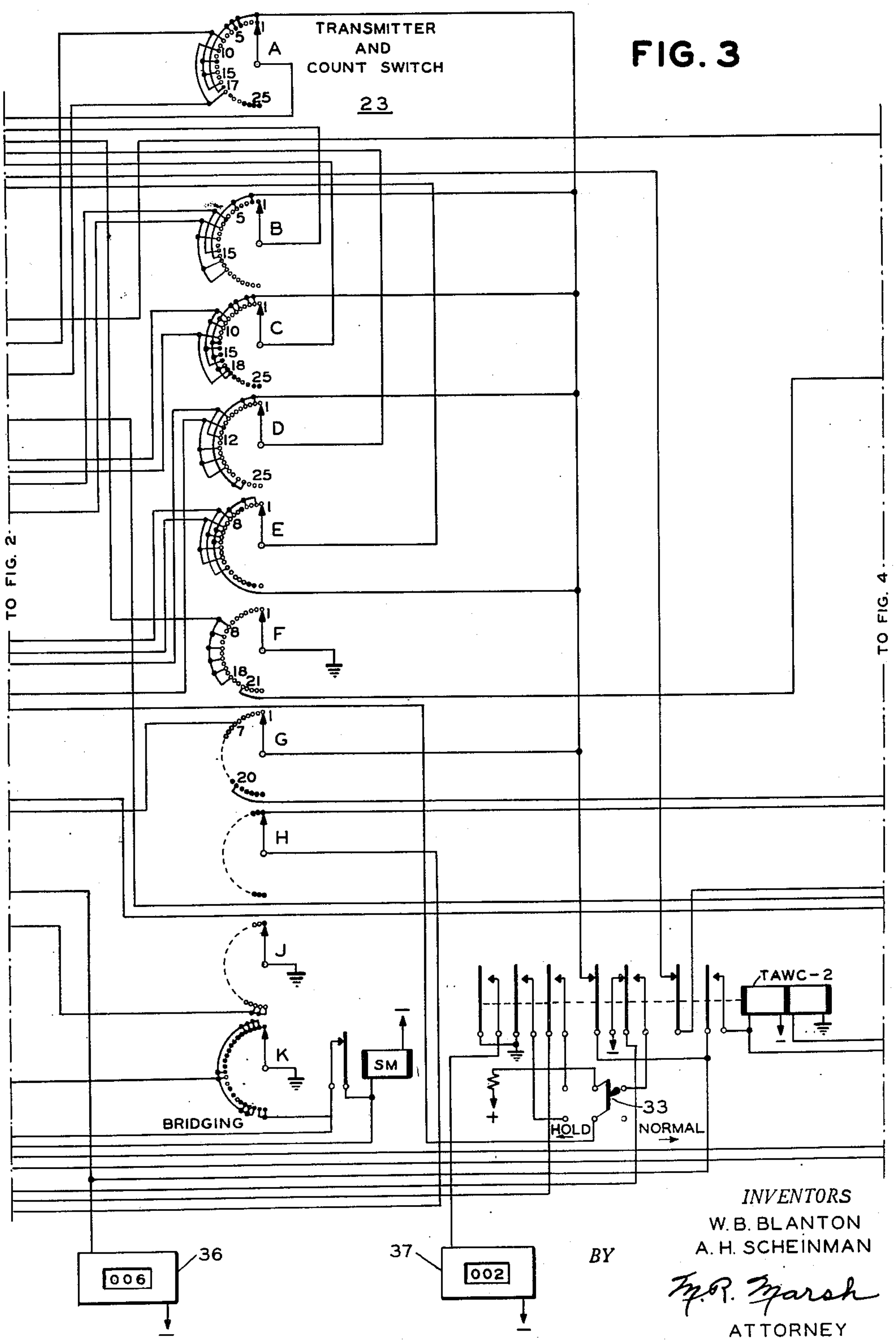
Figure 4:
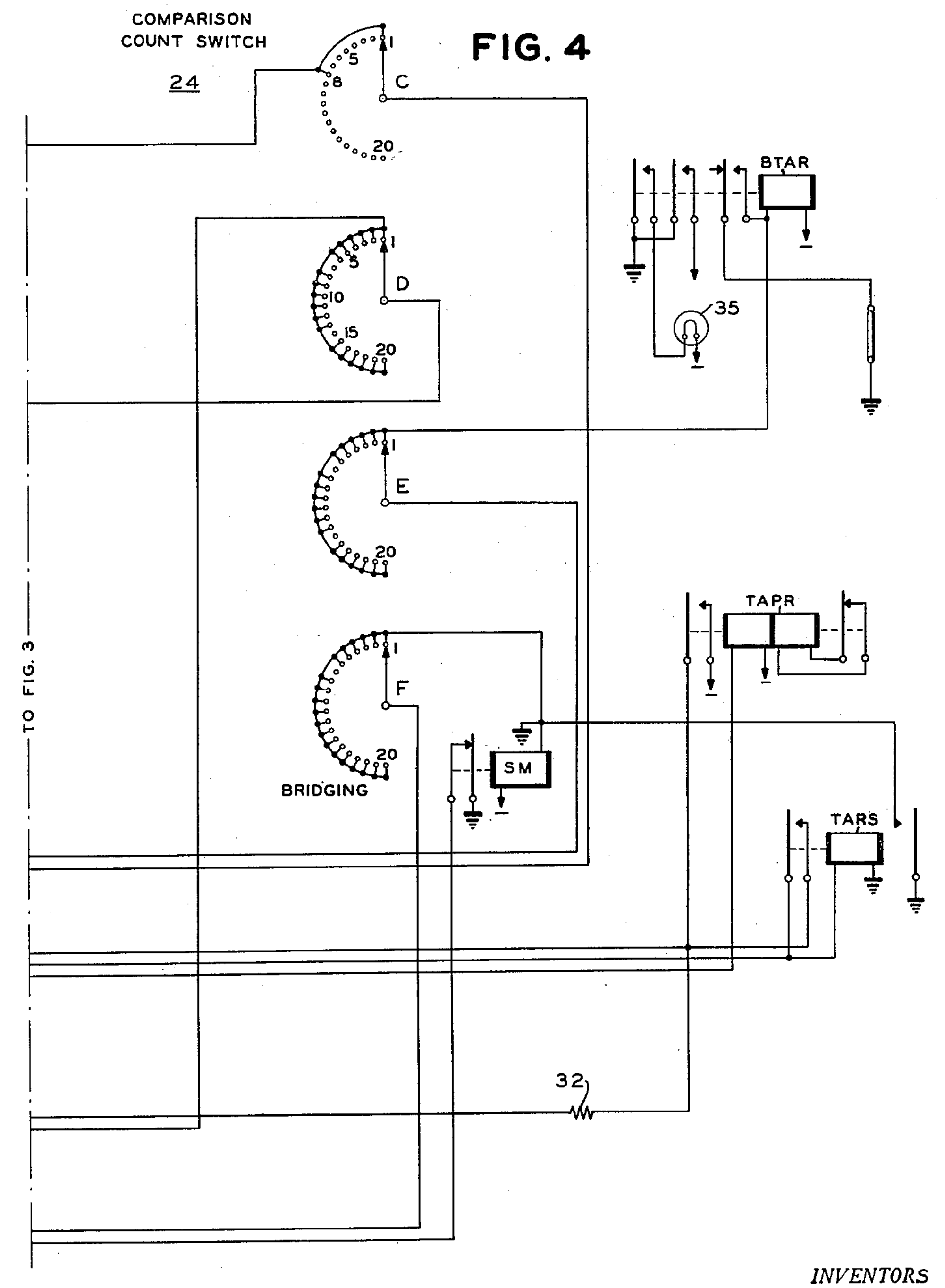

The present invention relates primarily to testing arrangements for telegraph switching systems and more particularly to an arrangement for testing and checking the operativeness of certain parts of the equipment and circuits employed in an automatic telegraph reperforator switching system, such as for example, the type disclosed in the copending application of W. B. Blanton et al. Serial No. 108,208, filed August 2, 1949, and entitled "Telegraph Switching System," now Patent Number 2,575,329, dated November 20, 1951.

The above-mentioned copending application discloses a reperforator switching system wherein messages received at a message receiving position in a switching center or those originating at the center are initially stored in a first storage medium such as a perforated tape with each message including, and being preceded by, message selecting or directing characters, message identifying characters, such as the office call letters of the originating office of the message, and the message sequence number. The selecting characters control a switching mechanism whereby a transmission path is automatically established for the accompanying message from a transmitter controlled by the first storage medium in the receiving position to a reperforator associated with the desired sending position and which functions to again store the message in a second storage medium adapted to control a line sending transmitter to transmit representative signals to the sending line. To insure proper cross-office transmission of a message from the storage tape of a receiving position to the storage tape of a sending position and the proper operation of various pieces of equipment employed, a predetermined part of each message transmitted cross-office or a part of the signals stored in the second storage medium are checked automatically. The particular signals checked in the above-mentioned application include the identifying characters of the message, such as the office call letters of the originating office and the message sequence number. If the designated characters check or compare properly with the characters set up in the comparing unit, cross-office transmission of the message proceeds uninterrupted. However, if the designated characters fail to check or compare properly, alarm devices such as signal lights and/or buzzers are operated and further cross-office transmission of the message is halted. In the system described in said copending application, a wrong comparison lamp at the sending position as well as one at the receiving position are operated to indicate to the attendants the particular positions involved and when the trouble is cleared the circuits are restored to their normal condition.

When a wrong comparison of the above nature occurs, both the receiving and sending positions are tied up until the trouble is cleared and while the trouble may be due to faulty equipment, normally the trouble is due to the characters checked being in an improper sequence or certain of the said characters being omitted. In any event a wrong comparison usually requires a checking by one or more attendants of the equipment and storage tapes at both sending and receiving positions.

In connection with the above, one of the objects of the present invention is to provide an automatic checking arrangement for systems of the above type which for certain classes of trouble resulting in a failure of the comparing characters of a message to check properly will isolate the trouble whereby it can more quickly and readily be rectified.

Another object of the invention is to provide an arrangement for the above type of systems for freeing the sending position on a wrong comparison when the wrong comparison is due to some cause other than improper cross-office transmission or improper operation of the sending position equipment.

A more specific object of the invention is to provide an arrangement and circuits for transmitting a series of test signals over the established intraoffice path involved when a wrong comparison occurs, and to check a part of the test signals perforated in the second storage medium with those transmitted.

A more specific object of the invention in connection with the above is to automatically release the sending position involved in a wrong comparison when the checked part of the test signals compares correctly whereby the sending position is available for the receipt of signals from other receiving positions.

Figure 5:
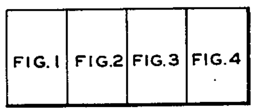

The above and further objects of the invention will be more apparent in the following detailed description wherein reference is made to the accompanying drawings in the latter of which:

Figs. 1 to 4, inclusive, show the equipment and circuits of a system embodying the present invention for testing the intraoffice transmission and some of the equipment and circuits of the above-mentioned copending application; and Fig. 5 shows the manner in which Figs. 1 to 4 may be arranged with respect to each other to form a complete circuit diagram of the system embodying the present invention.

Referring first to Fig. 1, some of the elements and circuits of the above-mentioned copending application Serial No. 108,208 are shown diagrammatically, said copending application being included herewith by reference, and the manner in which the circuits and apparatus of the present invention cooperate therewith.

In the above-mentioned copending application the occurrence of a wrong comparison effects among other things, the illumination of a lamp at the sending position involved whereupon the attendant investigates the trouble. If the attendant determined that the trouble was at some place other than the sending position she normally would immediately operate the push button 160, Fig. 19 of the said copending application, and cause the intraoffice reperforator 146 of the involved sending position to perforate certain characters or signals in the associated tape. If the trouble was found to be caused by misoperation of equipment at the sending position, the trouble would be corrected and then the push button 160 operated. The subsequent transmission of these signals to the sending line by the associated transmitter 172 serves to inform the distant office that the received part of the preceding message should be cancelled. In accordance with telegraphic practice the signals transmitted are letters shift, space, BUST, space, THIS, followed by two periods. The two periods which constitute an end-of-message signal release the sending position and make it available for use in connection with establishment of other intraoffice transmission paths. The device or unit for effecting the perforation of the predetermined characters in the sending position storage tape is shown primarily in Fig. 20 of the above-mentioned copending application and is hereinafter referred to as the manual BUST THIS unit in that manual operation is required to initiate it into operation.

In the arrangement of the present invention a so-called automatic BUST THIS unit is employed in conjunction with the manual BUST THIS unit, and the signals transmitted by the automatic unit constitute the test signals that are transmitted intraoffice for testing some of the intraoffice switching and repeating equipment. The automatic BUST THIS unit, like the manual BUST THIS unit, is arranged to serve a plurality of positions, the automatic unit serving a plurality of receiving or transmitter positions while the manual unit serves a plurality of sending positions. The automatic unit includes a multilevel rotary selector switch which operates to answer an electrical request from a receiving position and connect the automatic unit thereto. Also included in the automatic unit are two other multilevel rotary switches, a so-called transmitter and count switch and a comparison count switch. A plurality of relays and vacuum tubes are included in the automatic unit for purposes hereinafter set forth.

As fully described in the above-mentioned copending application the occurrence of a wrong comparison effects the operation of relay TAWC, Fig. 6 thereof, by a circuit through its right-hand coil. This relay is included in Fig. 1 of the drawings of the present application without the operating circuit therefor since it is fully shown and described in the said copending application. A similar TAWC relay is included in the circuit of each transmitter position and it is the operation of such a relay that causes the respective wrong comparison lamp 166 to glow and for an electrical request to be made for the automatic BUST THIS unit.

As shown in Fig. 1 of the present drawings, a point on each one of the five upper levels A to E, inclusive, of the selector switch 21 is connected in parallel to the leads extending from the tongues of the receiving position transmitter 3 to the tongues of relay TAXC. Other sets of points on these five levels are connected in a similar manner to the various other transmitter positions served by the automatic BUST THIS unit. It will now be assumed that the TAWC relay of the position connected to the No. 1 points of these levels is operated due to a wrong comparison or the failure of the message identifying characters perforated in the sending position storage tape 147 to correctly check with the sequence number or call letters assigned to the connected transmitter position.

The operation of relay TAWC completes a locking circuit for itself and one for operating relay TAW2 through its inner lefthand tongue and front contact to ground through the wrong comparison reset key 164. This tongue also completes a circuit through the left-hand tongue and back contact of relay TABT for illuminating the wrong comparison lamp 166. Through its outer left-hand tongue the operation of relay TAWC applies ground through a tongue and back contact of relay TABT to the associated point on the K or marking level of the selector switch 21. The operation of relay TAW2, as set forth, applies ground through back contacts of relay TABT to the initiate multiple or start circuit which is multipled to all of the other transmiting positions served by the automatic unit. This circuit extends through closed contacts of switch 22, the H wiper and No. 1 point or home position of the transmitter and count switch 23, the C wiper and No. 1 point or home position of the comparison count switch 24, back contacts of relay BTXC, and through the coil of relay BTSR to battery. This circuit causes relay BTSR to operate which completes a circuit from ground through a resistance 26, the interrupter springs of the step magnet SM of switch 21, the coil of relay BTRS, the outer right-hand tongue and front contact of relay BTSR, and the right-hand coil of relay BTPC to potential. The resistance 26 in the above circuit limits the flow of current to some value below that which will operate relay BTPC but which is sufficient to operate relay BTRS. Relay BTRS in operating completes a grounded circuit through its contacts and a front contact of relay BTSR through the coil of the step magnet SM to potential whereby the said step magnet is energized. The operation of the step magnet SM opens the above-described circuit through the coil of relay BTRS which in turn interrupts the circuit to the step magnet which thereupon releases and steps the wipers of switch 21 to the next point. Such operation of the step magnet SM and the involved circuits continues until the K level wiper of switch 21 reaches the grounded or marked point. When the switch wipers reach this point, the coil of relay BTRS and the resistance 26 is shorted out by the grounded point and relay BTPC will operate due to the direct ground applied to one terminal of the right-hand coil thereof. Relay BTPC in operating locks up by a circuit from ground through back contacts of relay BTDR, front contacts of relay BTPC and its left-hand coil and the coil of relay BTXC to potential. Relay BTXC is operated by the above circuit and in operating it interrupts the start circuit through the coil of relay BTSR which thereupon releases.

At this time the wipers of the selector switch 21 are resting on the points associated with the receiving or transmitter positions making the request for the automatic BUST THIS unit and relays BTPC and BTXC are operated and locked up by a circuit through back contacts of relay BTDR. As relay BTXC operates, the start circuit multiple is opened to prevent the seizure for the time being of the automatic BUST THIS unit by another transmitter position having a wrong comparison.

With the circuits of the automatic BUST THIS unit in the above condition, it is associated with the transmitter position making a request for the same and is now in readiness to begin the transmission of the so-called test signals. These test signals are similar to those sent from the manual BUST THIS unit and consist of the following code signals: letters, space, BUST, space, THIS, space, period and period. The test signals are set up on the points of the first five levels of the transmitter and comparison rotary switch 23 and could be any arrangement of signals. However, since the test signals are perforated in the storage tape associated with the sending position transmitter and are normally ultimately transmitted to the sending circuit, the BUST THIS serves to inform the distant office that the preceding part of the incomplete message is to be disregarded or cancelled while the double period at the end of the test signals serves to disconnect the sending position and render it available for seizure by other transmitter positions.

When relay BTPC operated in the manner pointed out above, it completed a circuit from ground through closed contacts of relay BT6P, a front contact of relay BTPC and through the coil of the step magnet SM of the transmitter and comparison switch 23 to potential. The wipers of switch 23 normally rest upon the No. 1 point or home position and when the circuit to the step magnet SM thereof is interrupted as set forth hereinafter, the wipers advance to the No. 2 points. As set forth in the above-mentioned copending application, the receiving position transmitter 3 is stepped by a step pulse generated in an impulse unit and the step pulse circuit normally extends through a back contact of relay TAWC. With relay TAWC operated this transmitter step pulse circuit, as shown in the accompanying drawings, is transferred through a front contact of relay TAWC to the associated point on the F level of selector switch 21. With the wipers resting on this point, the said transmitter step circuit is extended through a front contact of relay BTPC, the coil of relay BT6P and a tongue and back contact of relay TAWC-2 to potential. Thus when the transmitter step circuit is closed, relay BT6P will be energized to interrupt the circuit to the step magnet SM of rotary switch 23 to release the same whereupon the wipers thereof are advanced. At the end of this transmitter step impulse the step magnet SM is again energized but the switch will not step until the next transmitter step pulse.

The wipers of the first five levels A to E of selector switch 21 are connected by individual conductors to tongues of relay BTXC whose associated front contacts are connected through back contacts and tongues of relay BTCR to the first five wipers A to E of the transmitter and comparison switch 23. As stated above, various points on the first five levels of rotary switch 23 are connected in such a manner that the desired test signals are represented. These signals are represented by applying ground to various points thereof and this ground is connected through a back contact and tongue of relay TAWC-2, a front contact of relay BTPC and a back contact of relay BTDR. In accordance with the preferred embodiment, the character set up on the No. 2 points of the first five levels of switch 23 is "letters" and as the wipers contact these points, the letters character is transmitted over the above-described circuits to the conductors extending from the transmitter 3, thence acter will be transmitted to the reperforator 146 at the sending position. If the perforator is operating properly, the letters character will be perforated in the tape and at this time the tongues of the transmitter 3 are held down so that the character over the pins will not interfere with this transmission.

The No. 3 points of the five upper levels of switch 23 are coded by having a ground applied to various ones thereof to represent the "space" character, and when the next transmitter pulse operates relay BT6P, the wipers of switch 23 will advance to the third points and the space character will be transmitted to the reperforator 146. In the same manner the characters B, U, S, and T set up on the fourth, fifth, sixth and seventh sets of points of the upper five levels of switch 23 are transmitted to the reperforator 146 and if it is operating correctly, perforated in the associated tape 147. Switch 23 is now ready to step to its eighth point on the receipt of the next transmitter step impulse and following this operation the automatic BUST THIS unit is ready to compare the first character transmitted therefrom, which character will be letters and is at this time over the pins of the reading unit 11 associated with the tape 147. The circuits from the pins of the reading unit, as fully set forth in the above-mentioned copending application, are the same ones over which the intraoffice transmission was effected and will therefore extend to the tongues of relay BTXC. The front contacts of these tongues of relay BTXC, in addition to extending to back contacts of relay BTCR, are connected in parallel through resistances such as 27 and 28 to the control grids of a set of five OA4G vacuum tubes 29. With the wipers of rotary switch 23 on their No. 8 points a circuit is completed from ground through the F wiper thereof and the coil of relay BTCR to potential causing the said relay to operate and remove the wipers of the first five levels of rotary switch 23 from the intraoffice transmission path. Accordingly the vacuum tubes 29 will respond to the character in the reading unit 11 to cause various ones of individually associated relays TA1 to TA5 to operate or not depending upon what contacts in the reading unit 11 are closed.

The circuits for relays TA1 to TA5, when the associated tubes 29 are rendered conducting, extend from the plates thereof through the coils of said relays, a tongue and back contact of relay BTTO, a front contact of relay BTCR, a front contact of relay BTPC, and through the interrupter springs of the step magnet SM of comparison count rotary switch 24 to ground. All of the relays TA1 to TA5 are operated when representing a "letters" character and with any one of said relays operated, a circuit is completed from ground at a front contact of such a relay and an associated tongue through the left-hand coil of relay TAPR to potential, whereby the said relay TAPR operates. The letters character represented at this time by the relays TA1 to TA5 is compared by the following circuit: battery through closed contacts of TAPR, a back contact and tongue of relay TAWC-2, the front contact and outer left-hand tongue of relay BTCR, the E wiper and eighth point of transmitter and comparison switch 23, a front contact and tongue of relay TA5, a tongue and front contact of relay TA4, the eighth point and wiper of the D level of the switch 23, a front contact and tongue of relay BTCR, the C wiper and eighth point of switch 23, a front contact and tongue of relay TA3, a tongue and front contact of relay TA2, the eighth point and B wiper of switch 23, a tongue and front contact of relay BTCR, the A wiper and eighth point switch 23, a front contact and tongue of relay TA1 and through the coil of relay TARS to ground. Relay TARS is operated by this circuit and completes a circuit from ground through its coil and left-hand tongue and a front contact of relay TAPR to potential. Part of the latter circuit parallels one through a resistance 32 and the right-hand coil of relay TAWC-2. Relay TAWC-2, however, does not operate at this time since the coil of relay TARS has a low resistance and effectively shorts out the circuit through the right-hand coil of relay TAWC-2.

Had some character other than the letters combination appeared, during the above checking operation, over the pins in the reading unit 11, one or more of the TA1 to TA5 relays would not have been operated and accordingly the above circuit for operating relay TARS would not have been completed. Instead of relay TARS operating as set forth, relay TAWC-2 would have operated by a circuit from battery, a tongue and front contact of relay TAPR, through the resistance 32 and the right hand coil of relay TAWC-2 to ground. The operation of relay TAWC-2 indicates a wrong comparison between the character transmitted from the automatic BUST THIS unit and the character read back by the reading unit 11 for this character.

At this time the TA1 to TA5 relays will be operated in accordance with the character over the pins of the reading unit 11, and relay TAPR is operated by a circuit from ground at an inner front contact of one of these relays. Since it was assumed that the character compared correctly and caused relay TARS to operate, it will complete a circuit from ground through the coil of the step magnet SM of the comparison count switch 24 to potential whereby the step magnet is energized. As the step magnet SM operates, its interrupter springs remove ground from the operating circuit of relays TA1 to TA5 whereby the operated ones, which in this case is the entire set, release. The release of the operated one of the relays TA1 to TA5 opens the circuit through the coil of relay TAPR which releases and removes potential from the operating circuit of relay TARS. This causes relay TARS to also release which in turn opens the circuit to the step magnet SM of switch 24 to cause the wipers thereof to step off their home positions or points such as the No. 1 and No. 8 points to the No. 2 or No. 9 points. It will be assumed that the wipers of the comparison count switch 24 were previously on their No. 1 points and the operation of the step magnet SM thereof advanced the same to their No. 2 points. This advancement of the comparison count switch 24 indicates that the first character read back from the tape 147 compared correctly with the one set up on the No. 8 points of switch 23.

It will be noted that when the switch 23 reached its seventh position, a circuit was completed from potential through the coil of relay TABT, the J level wiper of switch 21, the No. 7 point and G level wiper of switch 23, back contacts and tongues of relays TAWC-2 and BTDR to ground. Thus at that time relay TABT will be operated and lock up by a circuit through a front contact of relay TAWC. Relay TABT in operating connects the wrong comparison lamp 166 to constantly operating grounded contacts 40 so that the lamp changes from a steady glow to flashing and thus indicates that the receiving position has been connected to the automatic BUST THIS unit. Relay TABT in operating also opens the start circuit and removes the ground from the marked point on the K level of the selector switch 21.

With the transmitter and comparison switch 23 resting in its 8th position, the next transmitter step impulse, in the manner described, causes the wipers thereof to be advanced to the 9th position. This operation of switch 23 removes the ground through the F wiper previously completing a circuit through the coil of relay BTCR so that said relay will release.

While the transmitter and comparison switch 23 is resting in its 9th position, a space combination is transmitted to the intraoffice path and will be reperforated in the sending position storage tape 147. Following this operation the switch 23 is advanced to its 10th position and at this time the second character or combination transmitted from the automatic BUST THIS unit is over the pins of the reading unit 11 and will be compared back with a space character set up on the 10th position points of the A to E levels of the switch 23. In a similar manner the automatic BUST THIS unit continues to transmit and check or compare characters in the sending position tape 147 with those set up on the points of switch 23 until they either all check correctly or a wrong comparison occurs. It will be noted that a character is compared and read back into the automatic BUST THIS unit six cycles of operation or steps of the switch 23 following its transmission. This is because of physical limitations requiring the sensing pins of the reading unit 11 to be spaced from the perforating pins of the reperforator 146.

After the letters character, the space character, the B, U, S and T have been compared, relay BTDR will operate as the wiper of the J level of rotary switch 23 reaches its 23rd point. Relay BTDR in operating removes ground from the locking circuit to relays BTPC and BTXC causing said relays to release, and this restores the BUST THIS unit to its normal condition where it is in readiness to answer another request from a receiving position. The transmission and perforation in the tape 147 of the double period in conjunction with the operation of the transmitter and comparison switch 23 through its 21st and 22nd points effects release of the involved sending position and its cross-office path and renders the same available for seizure by other receiving positions. The involved receiving position which requested the automatic BUST THIS unit, however, retains its wrong comparison signal light illuminated until the storage tape thereof is checked and the trouble which caused the original wrong comparison to be rectified, whereupon the receiving position may be released by depressing its release button.

If a wrong comparison had occurred in any cycle during the above described operation of the automatic BUST THIS unit, and caused operation of relay TAWC-2, as described, positive potential through normally closed right-hand contacts of the hold switch 33 would replace the normal negative potential terminating the transmitter step pulse circuit. The application of positive potential to the transmitter step pulse circuit in the manner pointed out in the above-mentioned application causes the operation of relay SACS, said relay being shown in Fig. 18 of said copending application, and which in turn causes operation of associated wrong comparison relay SAWC, also shown in Fig. 18 of said copending application. The said relays SACS and SAWC are in the sending position circuit and the operation of the latter causes illumination of wrong comparison lamp 168 therein to inform the attendant of the sending position involved. A wrong comparison, however, from the automatic BUST THIS unit does not tie up the said unit since it continues through its cycle of operation by the above described circuits until it is released in the manner described.

In the event of a wrong comparison detected in or resulting in connection with the operation of the automatic BUST THIS unit and causing operation of relays SACS and SAWC of the involved sending position as above set forth, it indicates that the trouble is likely to be found in the switching equipment employed in setting up the intraoffice path or in the sending position reperforator or reading unit 146 and 11 respectively. Most troubles of the above nature are due to the so-called tape jam where the storage tape 147 issuing from the reperforator 146 fails to advance properly in conjunction with the reperforator operations. If the trouble is due to a tape jam, the attendant may readily rectify the same after which the manual BUST THIS key 160, Fig. 19 of the said copending application, may be operated to cause bust this double period to be perforated in the tape 147 and subsequently transmitted to the line. The manner in which the operation of the BUST THIS manual key 160 effects the various functions is fully set forth in the above-mentioned copending application.

The first and eighth positions of the comparison count switch 24 are home positions and if the wipers thereof are not resting on their seventh or fourteenth points when the G level wiper of the transmitter and comparison switch 23 reaches its 20th point there is an indication that one of the switches failed to step correctly. In such an event, relay BTAR will be operated by a circuit from ground at the G level wiper of switch 23 and point 20, the E level wiper of comparison count switch 24, through any point thereof other than 7 or 14 to potential. Similarly, when switch 23 reaches point 21 a circuit will be completed from ground on the F level wiper through point 21, D level wiper of switch 24 and the left-hand coil of relay TAWC-2 to potential. The operation of relay TAWC-2 performs a function similar to that set forth above in its first described operation. The operation of relay BTAR establishes a locking circuit for itself and illuminates a lamp 35 to call the attention of the attendant.

A feature of the invention resides in the employment of a pair of electrical counters 36 and 37 of the type well known in the art and which advance dials in conjunction with each energization thereof. The counter 36 has a circuit completed thereto each time the automatic BUST THIS unit is employed and thus registers the number of times the unit is used. Counter 37 has a circuit completed thereto each time a wrong comparison occurs in conjunction with the operation of the automatic BUST THIS unit.

A further feature of the invention resides in the employment of the switch 22 in the automatic BUST THIS unit which when operated effectively disconnects the automatic BUST THIS unit from the receiving positions it normally serves whereupon the said positions can operate independently of the unit.

It will be noted that in the event of a wrong comparison with the hold switch 33 transferred from its normal right-hand position to the hold or left-hand position, the release of the automatic BUST THIS unit from the receiving position associated therewith is prevented until the operation of relay BTTO through its associated OA4G tube 38 and timer circuit. The operation of relay BTTO causes operation of BTDR which removes the locking ground from relays BTPC, BTXC and TAWC. Relay BTPC in releasing completes circuits for the self-stepping of switches 23 and 24 to their home positions whereby the unit is restored to normal. If no wrong comparison occurs with hold switch 33 in its hold position, the unit will operate in the normal described manner. In the preferred embodiment of the invention the delay circuit associated with tube 38 delays the firing thereof ten seconds which gives an attendant time to observe and inspect the rotary switches and determine the cause of trouble.

While the invention has been described in but a single illustrated embodiment thereof and the manner in which it may be applied to a particular type and arrangement of a telegraph switching system, it will be obvious that it is not limited in scope to the described embodiment and it is desired, therefore, that only such limitations be placed on the invention as are imposed by the appended claims.

What is claimed is:

1. In a telegraph system, a switching office having a message receiving position including equipment for receiving, storing and transmitting message signals, and a message sending position also including equipment for receiving, storing and transmitting message signals, means for establishing a transmission path between said receiving position and said sending position and transmitting a message thereover whereby a message in the storing means of the receiving position is transferred to the storing means of said sending position, means for automatically comparing at least a part of the signals stored by the storing means of said sending position with predetermined message identifying signals, and means operative on the failure of said compared signals to correspond to automatically transmit test signals over said transmission path for storage in said medium and to determine the accuracy of the stored test signals.

2. In a telegraph system, a switching office having a message receiving position including equipment for receiving, storing and transmitting message signals, and a message sending position also including equipment for receiving, storing and transmitting message signals, means for establishing a transmission path between said receiving position and said sending position and transmitting a message thereover whereby a message in the storing means of the receiving position is transferred to the storing means of said sending position, means for automatically comparing at least a part of the signals stored by the storing means of said sending position with predetermined message identifying signals, means operative on the failure of said compared signals to correspond to automatically transmit test signals over said transmission path for storage in said medium and to determine the accuracy of the stored test signals, and means for automatically releasing the sending position when the stored test signals have been determined accurate.

3. In a telegraphing system, a switching office having a message receiving position including equipment for receiving, storing and transmitting message signals, and a message sending position also including equipment for receiving, storing and transmitting message signals, means for establishing a transmission path between said receiving position and said sending position and transmitting a message thereover whereby a message in the storing means of the receiving position is transferred to the storing means of said sending position, means for automatically comparing at least a part of the signals stored by the storing means of said sending position with predetermined message identifying signals, and means operative on the failure of said compared signals to correspond to automatically determine the operativeness of signal receiving and storage equipment of the sending position.

4. In a telegraph system, a switching office having a message receiving position including equipment for receiving, storing in a storage medium and transmitting message signals, and a message sending position also including equipment for receiving, storing in a storage medium and transmitting message signals, means for establishing a transmission path between said receiving position and said sending position, means including parts of said equipment and said transmission path for transferring a message from the storage medium of said receiving position to the storage medium of said sending position, mans for automatically comparing at least a part of the signals stored in the storage medium of said sending position with predetermined message and receiving position identifying signals, and means operative on the failure of said signals to correspond to automatically transmit test signals over said transmission path.

5. In a telegraph system, a switching office having message receiving and transmitting positions, said positions having means for receiving and storing message signals in associated storage mediums, means for establishing transmission paths between receiving and selected sending positions and transmitting messages thereover whereby the messages appear in the storage medium of said sending positions, means for automatically comparing at least a part of the signals of each message stored in the storage medium of said sending positions with message and receiving position identifying signals, and means operative on the failure of said compared signals to correspond to automatically operate the storing means to perforate test signals in the storage medium of the involved sending position.

6. In a telegraph switching system, a plurality of receiving lines each having individual signal storage and transmitting means, a plurality of sending lines each having individual signal storage means, means for establishing a transmission path from the transmitting means of a receiving line to the storage means of a sending line whereby signals in the storage means of a receiving line are transferred to the storage means of a sending line, a test signal transmitting position, means for transmitting test signals over said transmission path from said test signal transmitting position and storing the same in the storage means of the involved sending line, and means for retransmitting at least a part of the stored test signals to the test signal transmitting position to thereby test the reception and storage of at least a part of the test signals by the storage means of the involved sending line.

7. In a telegraph switching system, a plurality of receiving lines each having individual signal storage and transmitting means, a plurality of sending lines each having individual signal storage means for storing signals to be transmitted over said lines, means for establishing a transmission path from the transmitting means of a receiving line to the storage means of a sending line whereby signals in the storage means of a receiving line are transferred to the storage means of a sending line, a test signal generating means, means for associating said test signal generating means with any one of said receiving lines at a time to transmit test signals over an established path and for storing the transmitted test signals in the storage means of the involved sending line and means for retransmitting at least a part of the stored test signals to the test signal generating means to thereby test the reception and storage of at least a part of the test signals by the storage means of the involved sending line.

8. In a telegraph switching system, a plurality of receiving lines each having individual signal storage and transmitting means, a plurality of sending lines each having individual signal storage means, means for establishing a transmission path from the transmitting means of a receiving line to the storage means of a sending line whereby signals in the storage means of a receiving line are transferred to the storage means of a sending line, a test signal generating means, means for associating said test signal generating means with any one of said receiving lines at a time to transmit test signals over an established path and for storing the test signals in the storage means of the involved sending line and means operative concomitantly with transmission of said test signals and controlled by the stored test signals for automatically determining the accuracy of at least a part of the stored test signals.

9. In a telegraph switching system, a plurality of receiving lines each having individual signal storage and transmitting means, a plurality of sending lines each having individual signal storage means, means for establishing a transmission path from the transmitting means of a receiving line to the storage means of a sending line whereby signals in the storage means of a receiving line are transferred to the storage means of a sending line, a test signal generating means, means for associating said test signal generating means with any one of said receiving lines at a time to transmit test signals over at least a part of an established path for storing in the storage means of the involved sending line and means controlled by the storage means of the involved sending line for automatically determining if the test signals are stored and the accuracy of operation of the storing means in storing the same.

10. In a telegraph system, a reperforator for storing received message code signals in a storage medium with each message including message identifying codes, means for establishing code signals to represent what the stored message identifying codes should be, means for comparing said established signals with the message identifying signals stored in said medium, and means for automatically transmitting predetermined signals to said reperforator when said stored identifying codes do not correspond with representative ones.

11. In a telegraph system, a reperforator for storing received message code signals in a storage medium, a plurality of transmitters, switching means for associating said reperforator with any one of said transmitters at a time to receive message code signals therefrom and store the same in said storage medium with each message including transmitter identifying codes, means for checking the transmitter identifying codes in said medium to determine if they represent the associated transmitter and means operative when the checked codes do not represent the associated transmitter to automatically disassociate the same therefrom and transmit a series of predetermined code to said reperforator.

12. In a telegraph system, a reperforator for storing received message code signals in a storage medium, a plurality of transmitters, switching means for associating said reperforator with any one of said transmitters at a time to receive message code signals therefrom and store the same in said storage medium with each message including transmitter sequence and identifying codes, means for checking the transmitter sequence and identifying codes in said medium to determine if they represent the associated transmitter and the correct sequence of message therefrom, means operative when the checked codes are not correct to operate said reperforator to normally perforate a series of predetermined codes in said medium, means to check for the presence and accuracy of said predetermined codes in said medium, and means effective when said predetermined codes are present and accurate to disassociate the reperforator from the associated transmitter and render it associatable with any one of the other transmitters.

13. In a telegraph system, a reperforator for storing received message code signals in a storage medium, a plurality of transmitters, switching means for associating said reperforator with any one of said transmitters at a time to receive message code signals therefrom and store the same in said storage medium with each message including transmitter identifying codes, means for checking the transmitter identifying codes in said medium to determine if they represent the associated transmitter, means operative when the checked codes are incorrect to transmit to said reperforator for storage in said medium a series of predetermined codes, means to check for the presence and accuracy of said predetermined codes in said medium with the transmitted codes, and means effective when said predetermined codes are present and accurate to disassociate the reperforator from the associated transmitter and render it associatable with any one of the other transmitters.

WILLIAM B. BLANTON.
ARNOLD H. SCHEINMAN.

REFERENCES CITED

The following references are of record in the file of this patent:

UNITED STATES PATENTS

| Number | Name | Date |
|---|---|---|
| 2,293,704 | Blanton | Aug. 25, 1942 |